Figure 1A:
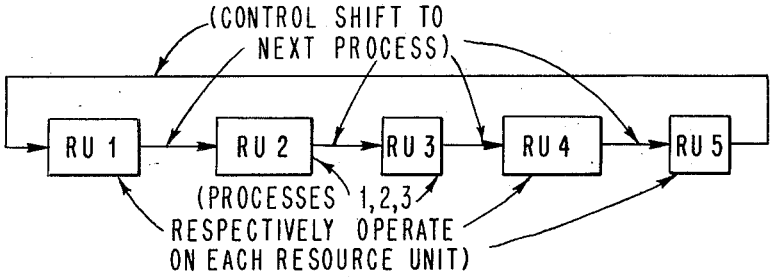
Figure 1B:
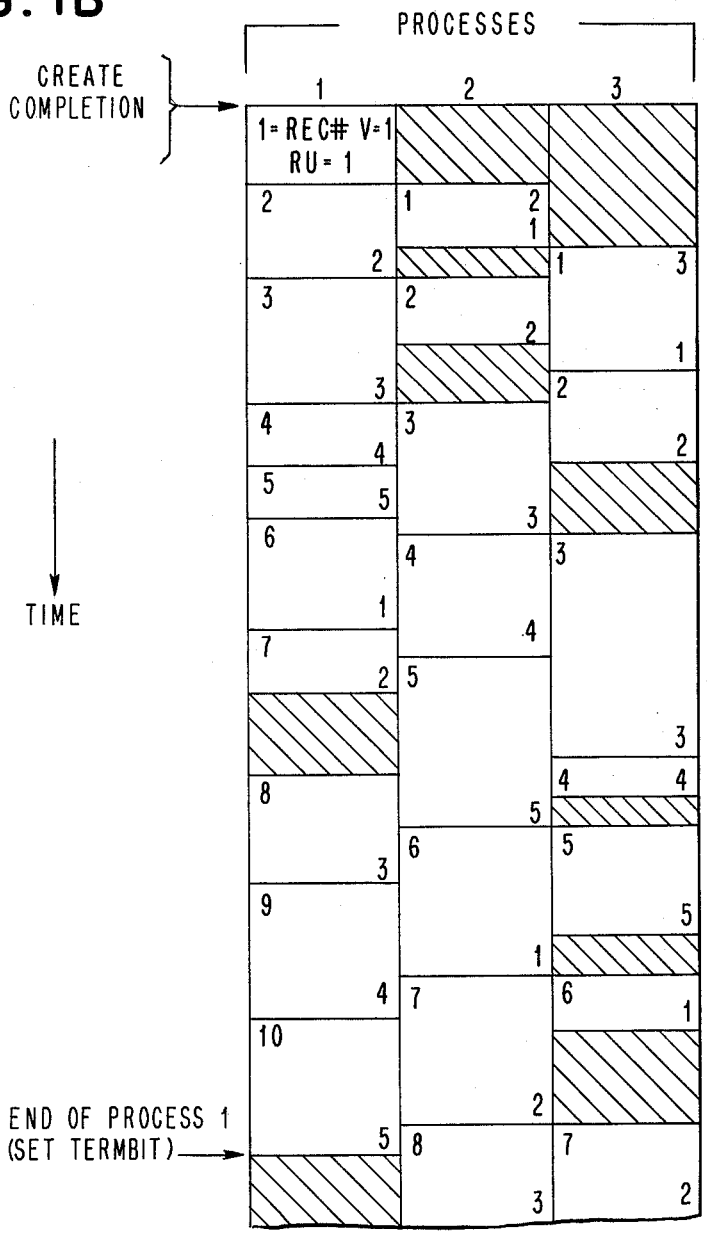
Figure 1C:
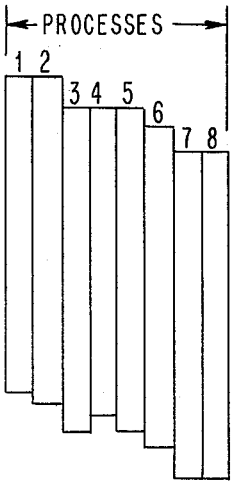
Figure 2A:
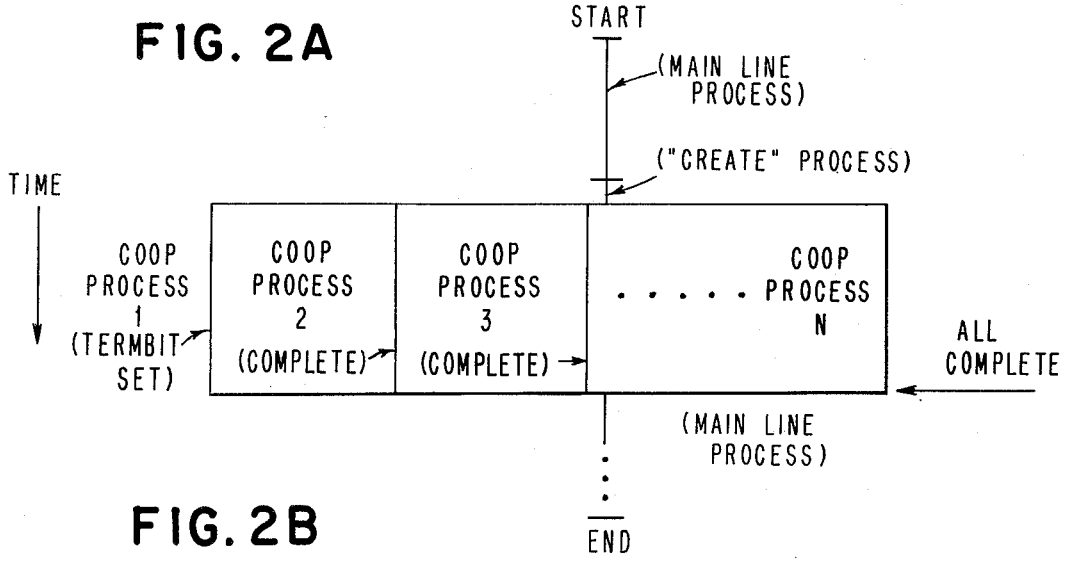
Figure 2B:
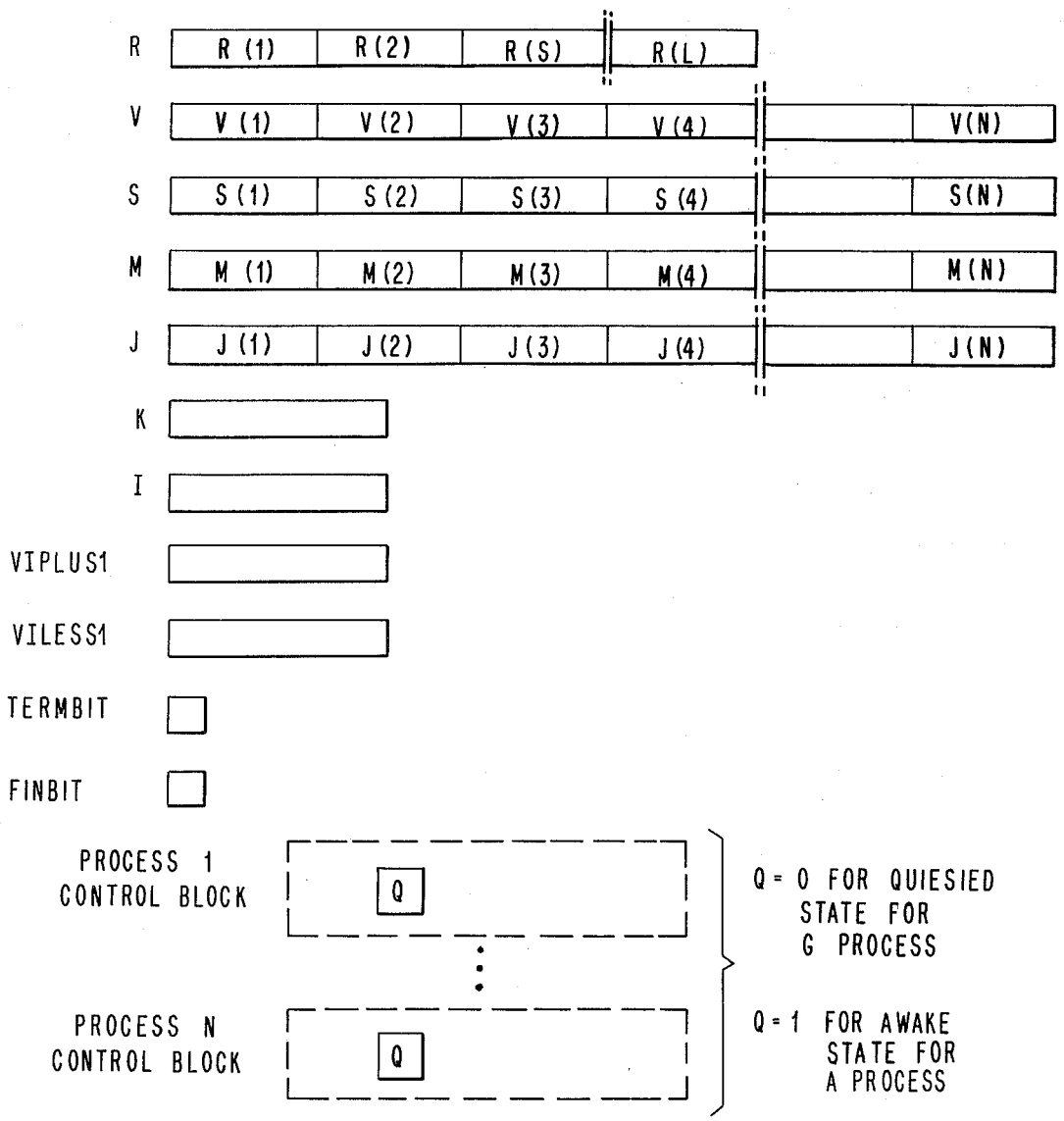
Figure 3:
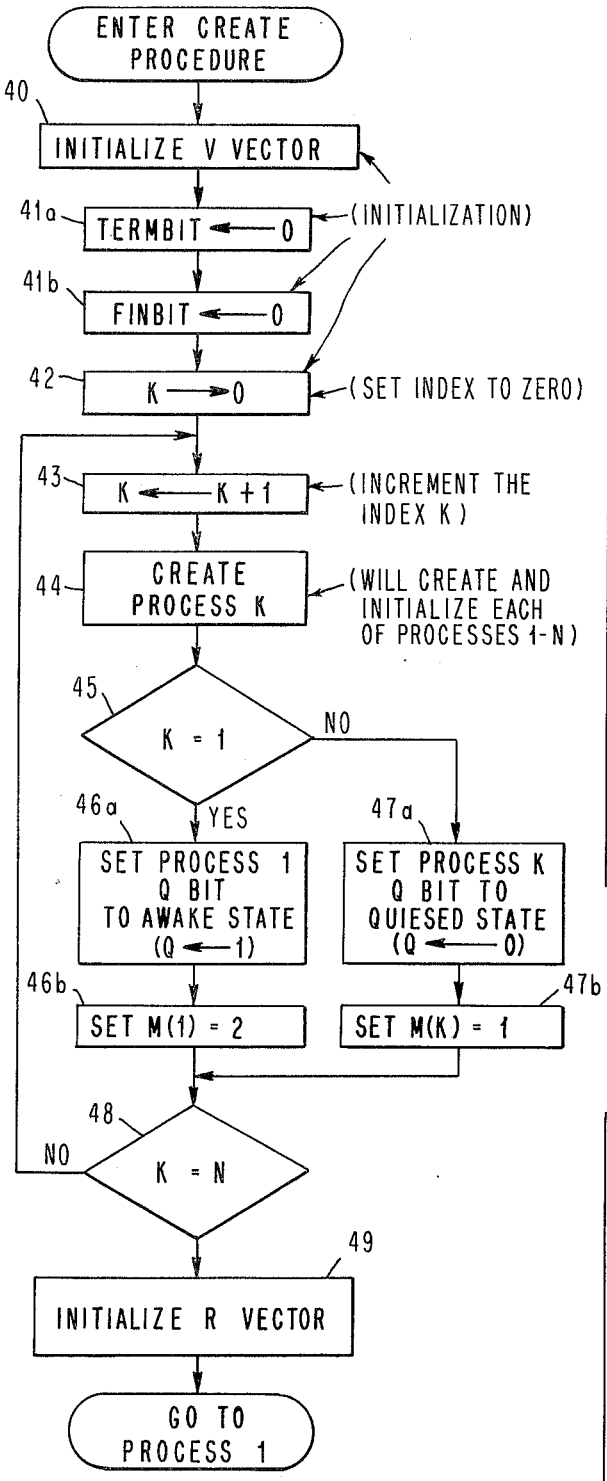
Figure 4A:
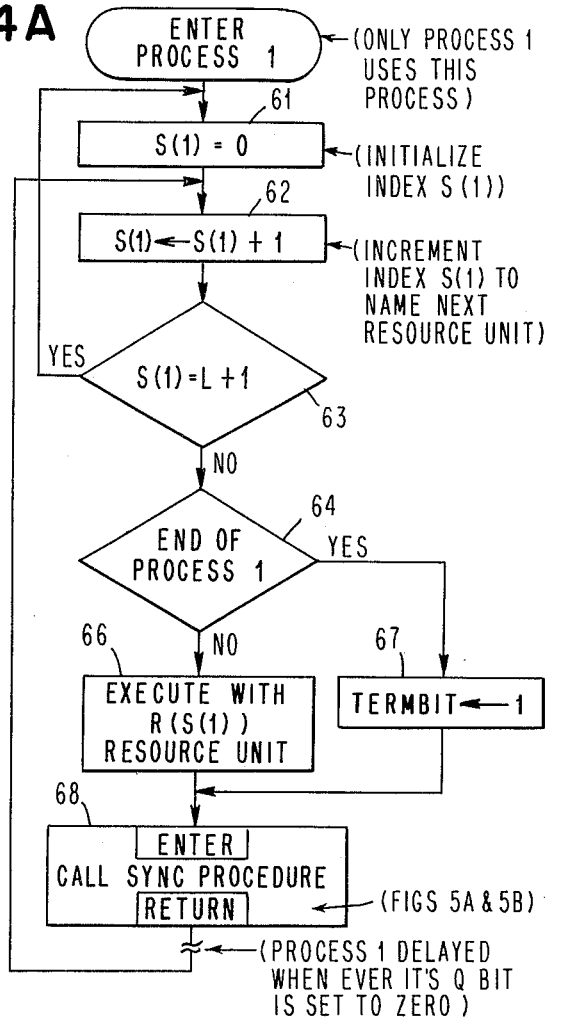
Figure 4B:
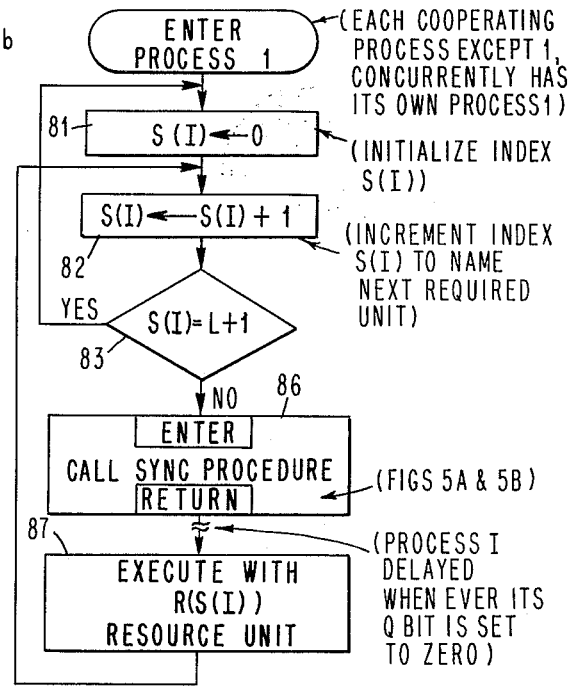
Figure 5A:
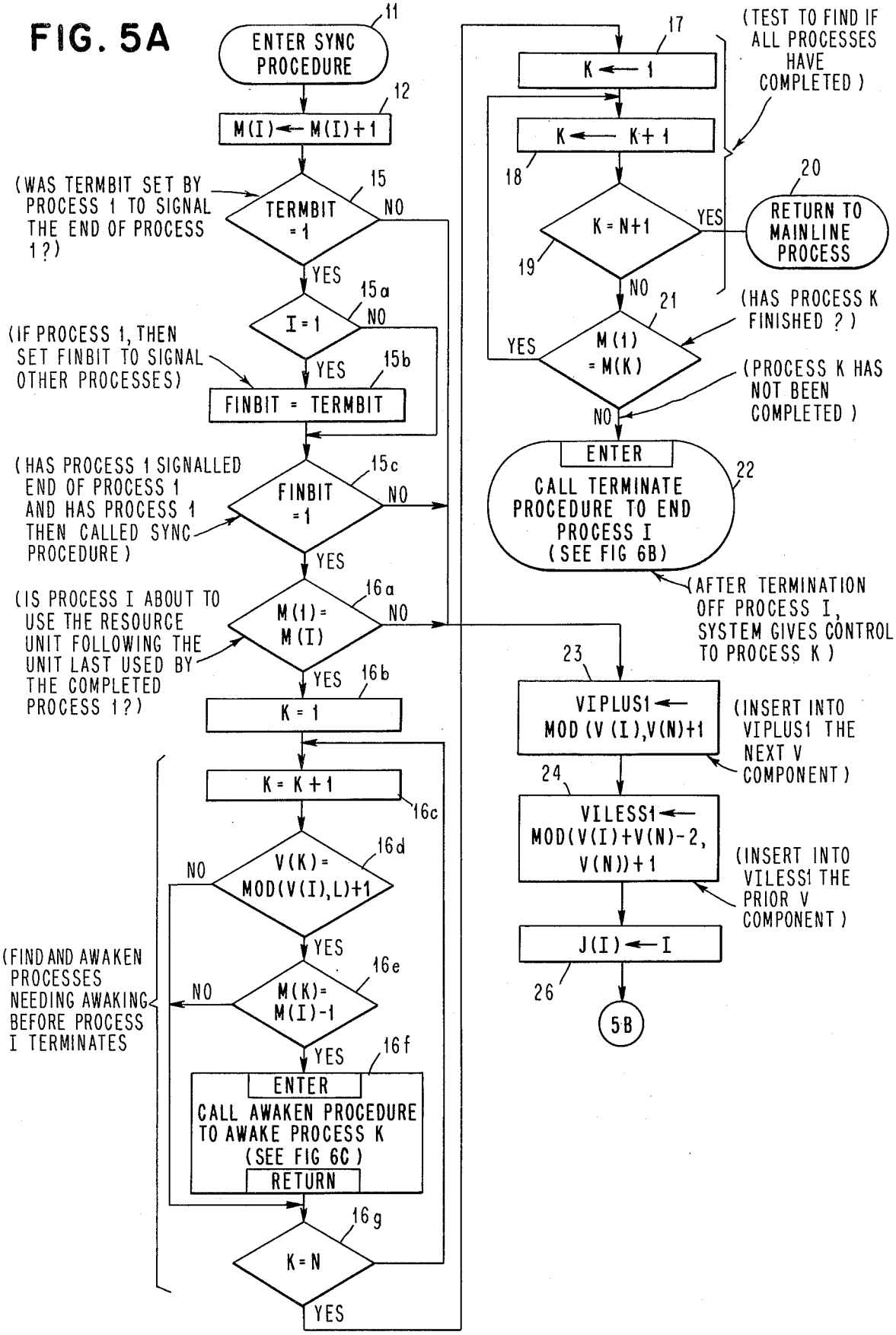
Figure 5B:
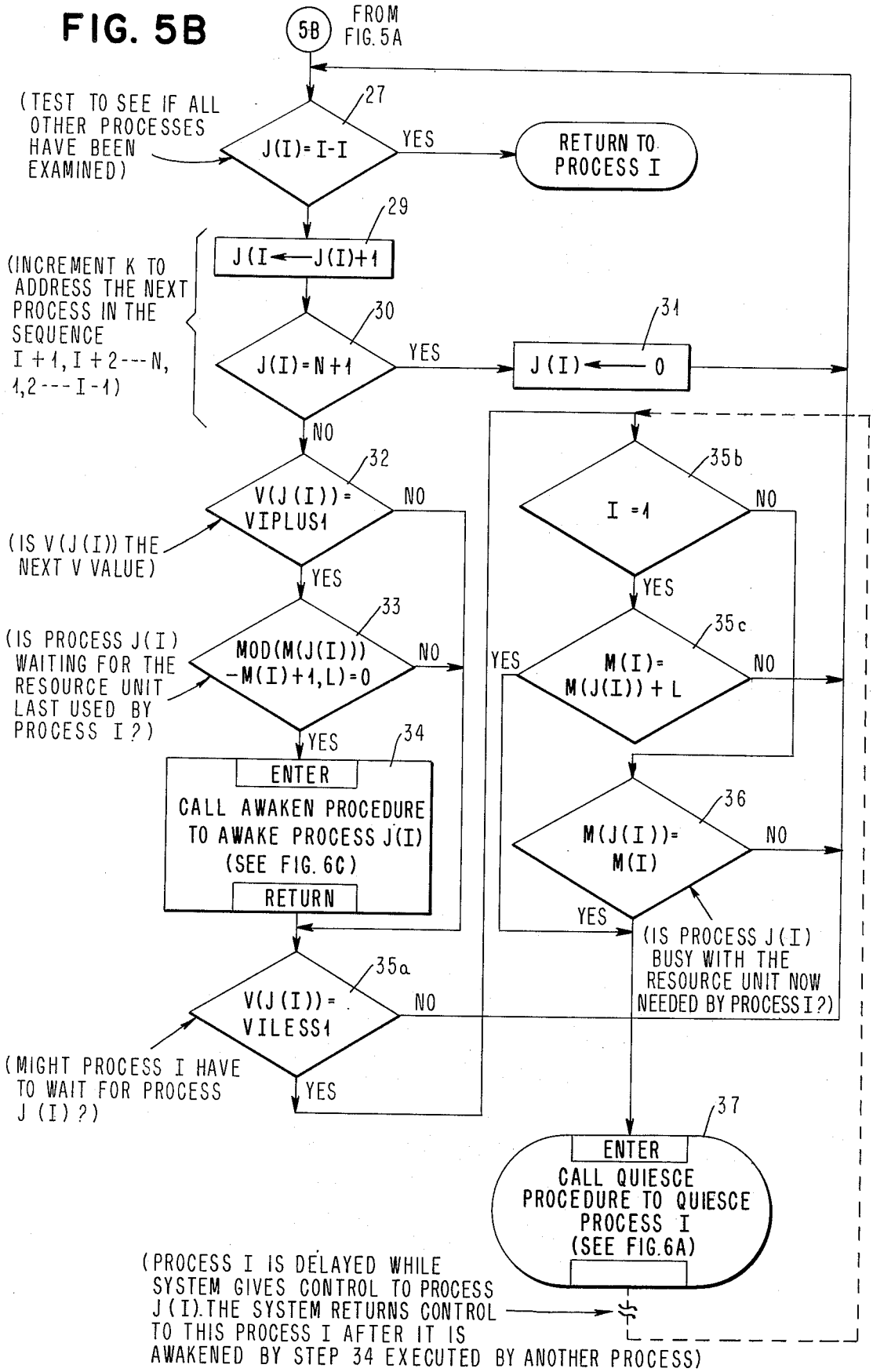
Figure 6A:
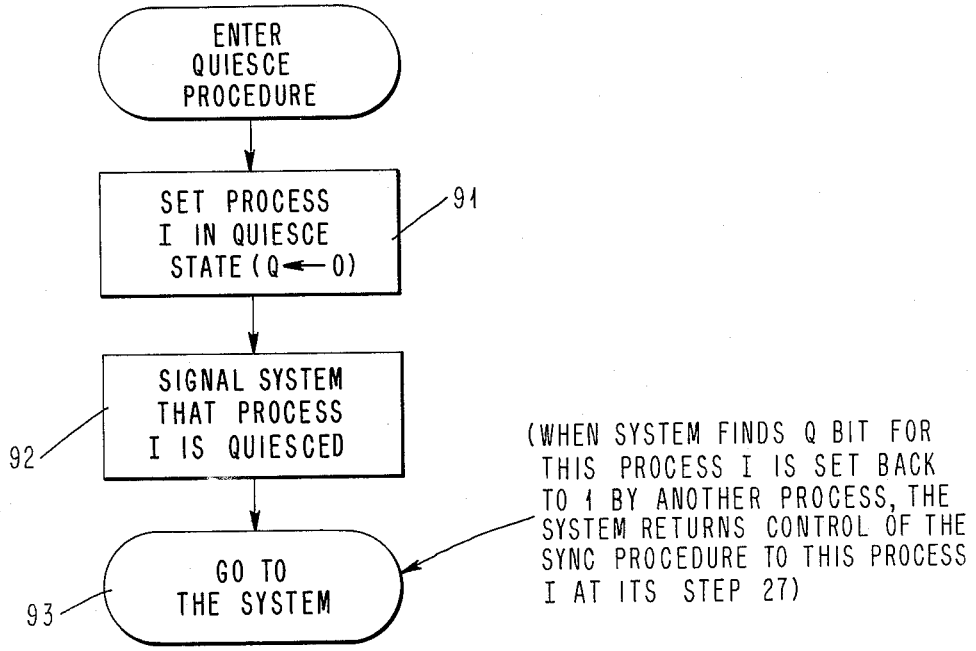
Figure 6B:
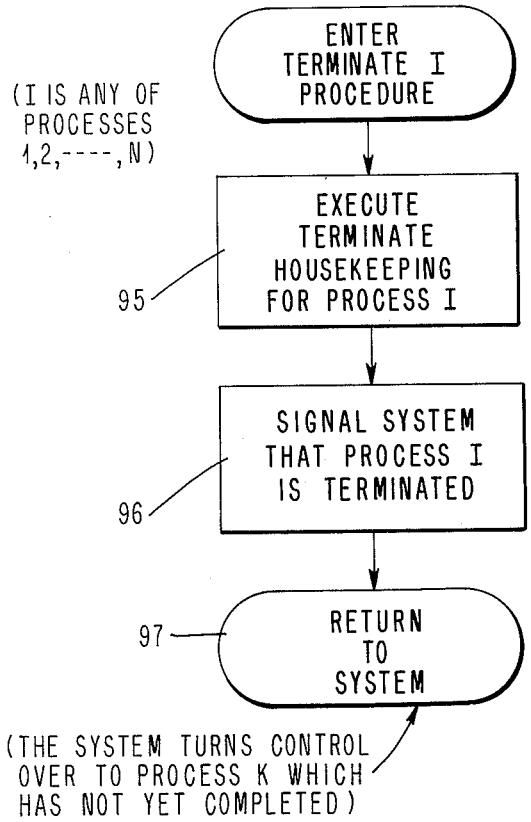
Figure 6C:
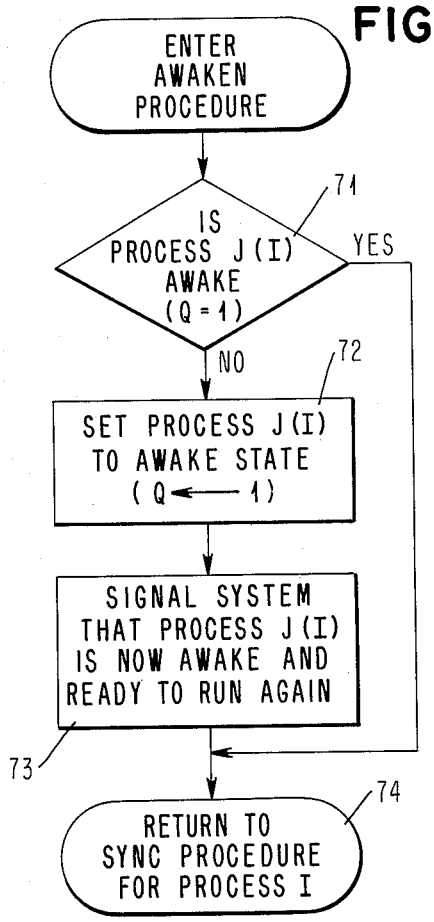

United States Defensive Publication [19] (H) [11] T971,005

Collier [43] June 6, 1978

[54] METHOD FOR SYNCHRONIZING SETS OF INTERACTING PROCESSES

[75] Inventor: William Wilkinson Collier, Wappingers Falls, N.Y.

[73] Assignee: International Business Machines Corporation, Armonk, N.Y.

[21] Appl. No.: 796,786

[22] Filed: May 13, 1977

Related U.S. Application Data

[63] Continuation of Ser. No. 425,358, Dec. 17, 1973, abandoned, which is a continuation of Ser. No. 212,282, Dec. 27, 1971, abandoned.

[51] Int. Cl.[2] ..... G06F 9/00

[52] U.S. Cl. ..... 364/300

[57] ABSTRACT

Allows a set of processes to operate cyclically on a set of shared resources (e.g. I/O buffers). Each process is allowed to proceed at its own speed, subject only to a synchronization condition that it does not operate simultaneously on a resource with any member of the next (cyclic) subset of processes.

9 Claims, 6 Sheets Drawing,

32 Pages Specification

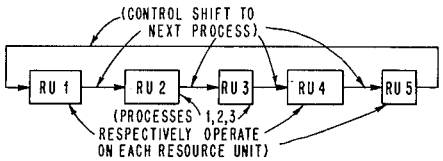

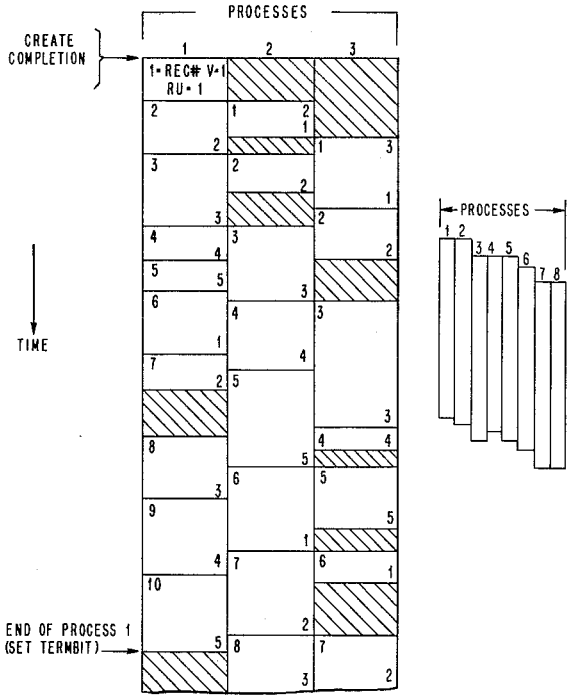

The file of this unexamined application may be inspected and copies thereof may be purchased (849 O.G. 1221, Apr. 9, 1968).